United States Patent [19]

Rudaitis et al.

[11] 3,893,207
[45] July 8, 1975

[54] VEHICLE HOOD RETENTION DEVICE

[75] Inventors: Edward J. Rudaitis, Warren; Lowell Ray Ulrich, Utica, both of Mich.

[73] Assignee: General Motors Corporation, Detroit, Mich.

[22] Filed: Mar. 8, 1974

[21] Appl. No.: 449,279

[52] U.S. Cl. .................... 180/69 C; 292/DIG. 14
[51] Int. Cl. ............................................ B62d 25/10
[58] Field of Search .......... 180/69 C, 69 R; 296/76; 16/128.1; 70/240; 292/DIG. 14

[56] References Cited
UNITED STATES PATENTS

| | | | |
|---|---|---|---|
| 2,193,132 | 3/1940 | Hynes | 292/DIG. 14 |
| 2,606,625 | 8/1952 | Paton | 180/69 C |
| 2,815,822 | 12/1957 | Ramsey | 180/69 R |
| 3,339,226 | 9/1967 | Brown | 16/128.1 |
| 3,767,001 | 10/1973 | Chupick | 180/69 C |

*Primary Examiner*—Kenneth H. Betts
*Assistant Examiner*—David M. Mitchell
*Attorney, Agent, or Firm*—H. Furman

[57] ABSTRACT

A retention device for retaining the rear corners of a vehicle hood which is hinged to the body at its rear corners. The hood retention device includes a pin extending upwardly and forwardly from a body bracket at the rear corner of the hood opening so as to be received within an aperture of a hood bracket when the hood is in the closed position. An apertured retaining plate is pivotally mounted on the hood bracket and has an aperture which closely surrounds the pin. A spring biases the retaining plate to a normal position with respect to the pin wherein the retaining plate engages the pin upon attempted opening movement of the hood to prevent substantial opening movement. An operator actuated cable is attached to the retaining plate for biasing the retaining plate to a second position with respect to the pin wherein the hood may be pivoted to open position without engagement of the pin by the retaining plate. The operating cable is attached to the conventional safety latch at the forward end of the hood so that the retention device is released when the safety latch is released.

5 Claims, 5 Drawing Figures

PATENTED JUL 8 1975  3,893,207

SHEET 1

VEHICLE HOOD RETENTION DEVICE

The invention relates generally to vehicle body hoods and more particularly to a device for retaining the hood in closed position.

Vehicle bodies typically have a forward engine compartment and a hood or closure panel having its rear end connected to the body by hood hinges which permit movement of the hood between hood open and closed positions. Such conventional vehicle bodies also typically have a hood latch mechanism acting between the vehicle body and the front end of the hood to retain the hood in the closed position. It is also common to provide a safety latch as shown in Hammond U.S. Pat. No. 3,003,800 which allows the hood to pop up only a small distance when the hood latch mechanism is released and then must be separately actuated to permit movement of the further hood to full open position.

The present invention provides a hood retention device which retains the rear end of the hood against opening movement.

According to the invention, a bracket on the body at the rear corner of the hood opening has an upwardly extending and forwardly inclined pin which extends through an aperture in a hood bracket when the hood is in the closed position. An apertured retaining plate is pivotally mounted on the hood bracket and closely surrounds the pin. The apertured retaining plate is spring biased to a normal position wherein it will be engaged with the pin upon attempted opening movement of the hood to thereby prevent substantial opening movement. An operating cable is connected to the apertured retaining plate for pivoting the apertured retaining plate to a second position relative the pin so that when the hood is moved to open position the retaining plate does not engage the pin. Such a hood retention device is preferably provided at both rear corners of the hood. The bracket on the body and the bracket on the closure panel are preferably those brackets which mount the hood hinge linkage. The operating cable for pivoting the retaining plate is preferably connected to a conventional safety latch at the forward end of the hood so that the hood retention device at the rear corners of the hood is released when the vehicle operator releases the safety latch.

These and other objects, features and advantages of the present invention are readily apparent from the following detailed description of the preferred embodiment and the drawings in which.

Figure 1:
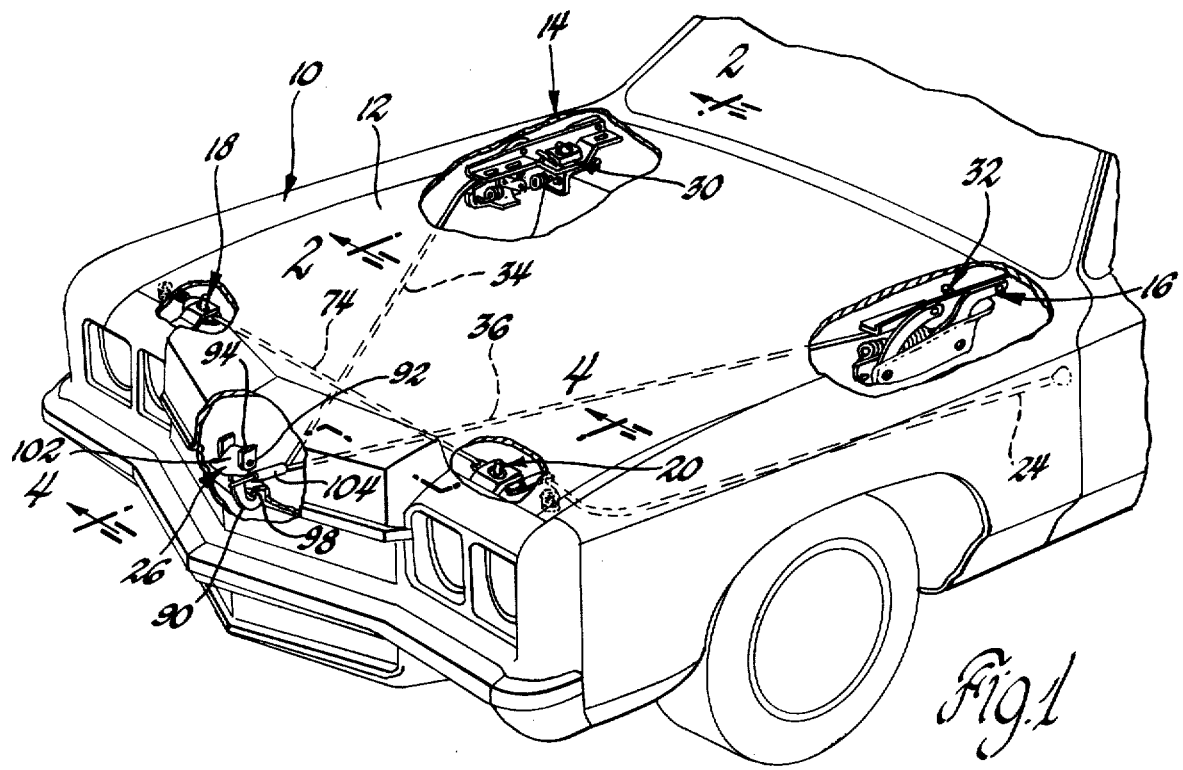
FIG. 1 is a perspective view of a vehicle body having a hood retention device according to the invention and showing the hood in closed position.

Referring to FIG. 1 a vehicle body indicated generally at 10 has an engine compartment closed by a hood or closure panel 12. The hood 12 is connected at its rearward corners to the vehicle body by hood hinges indicated generally at 14 and 16 which support the hood for movement between the shown closed position and an open position providing access to the engine compartment.

The forward corners of the hood 12 are respectively releasably latched to the vehicle body by conventional like hood latch mechanisms 18 and 20. The hood latch mechanisms 18 and 20 are releasable by operator actuation of a control cable 24 as will be further described hereinafter.

A conventional hood safety latch generally indicated at 26 is provided to permit partial opening of the hood 12 upon actuation of the control cable 24. The safety latch 26 is manually actuatable as will be hereinafter described to release the hood 12 for full opening movement as permitted by hood hinges 14 and 16.

Hood retention devices 30 and 32 are associated respectively with the hood hinges 14 and 16 and retain the rear corners of hood 12 against opening movement as will be more fully described hereinafter. The hood retention devices 30 and 32 are releasable upon release of the safety latch 26 by virtue of an interconnection provided by cables 34 and 36.

Figure 4:
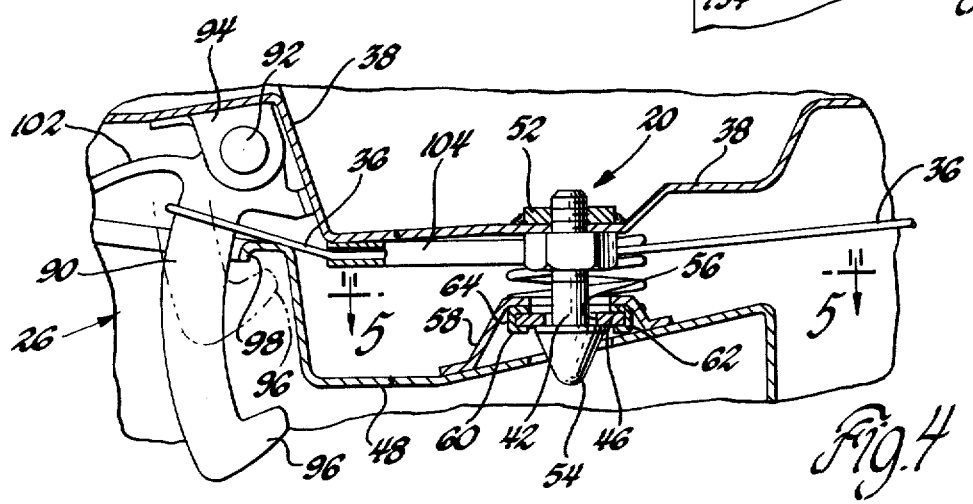
FIG. 4 is a side elevation view of the hood latch mechanism and the safety latch taken in the direction of arrows 4—4 of FIG. 1.
Figure 5:
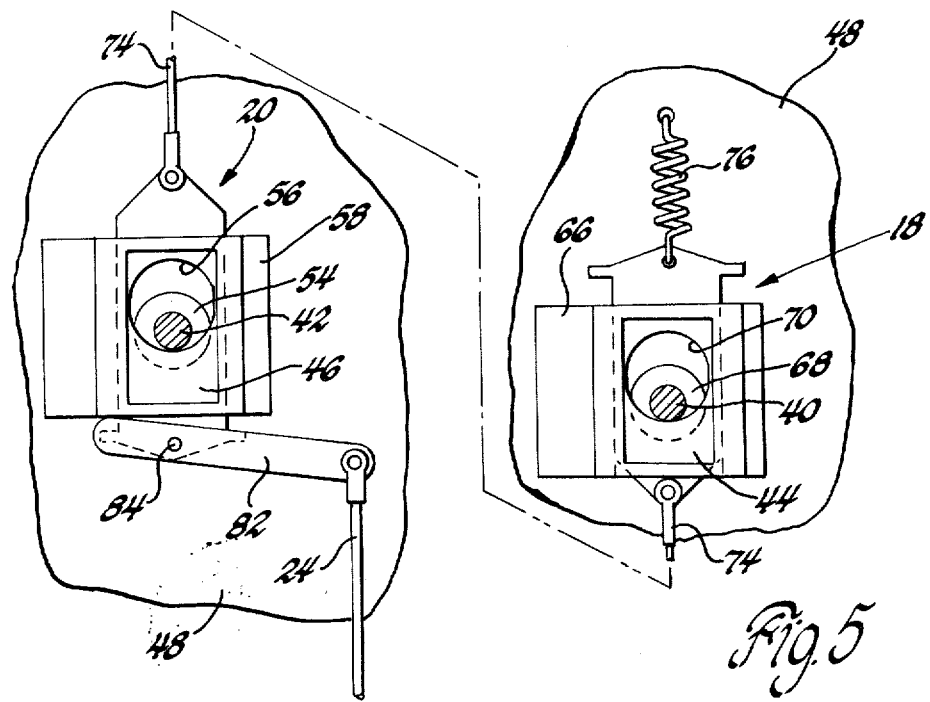
FIG. 5 is a fragmentary plan view taken in the direction of arrows 5—5 of FIG. 4.

Referring to FIGS. 4 and 5 it will be seen that the hood latch mechanisms 18 and 20 respectively include conically headed studs 40 and 42 attached to the inner panel 38 of hood 12 and sliding lock plates 44 and 46 mounted on a body panel 48. Referring to FIG. 4, the conically headed stud 42 of hood latch mechanism 20 is attached to the hood inner panel 38 by nuts 52 and has a conical head 54 which is received in an aperture 56 of the sliding lock plate 46. The sliding lock plate 46 is mounted for lateral sliding movement within channel portions 60 and 62 of a bracket 64 which is mounted on the body panel 48 by a bracket 58. Sliding lock plate 44 of hood latch mechanism 18 is similarly mounted by a bracket 66. Sliding lock plate 44 has a central aperture 70 through which the conical head 68 of the conically headed stud 40 may be inserted. Sliding lock plates 44 and 46 are connected by cable 74. A spring 76 acts between sliding lock plate 44 and body panel 48 to urge sliding lock plate 44 to its normal locked position of FIG. 5 in which the conical head 68 of conically headed stud 40 is captured within the aperture 70 to latch the hood panel 12 in closed position. Cable 74 in turn pulls the sliding lock plate 46 to its normal locked position of FIG. 5 in which the conical head 54 of the conically headed stud 42 is captured within the aperture 56 of sliding lock plate 46. A lever 82 is pivoted at 84 to the sliding lock plate 46 and engages the bracket 64 so that when lever 82 is actuated the sliding lock plate 46 and sliding lock plate 44 are moved laterally to align their respective apertures 56 and 70 with the conical heads of the conically headed studs 40 and 42 to unlatch the hood 12 for opening movement. The control cable 24 is connected to the lever 82 and terminates within the passenger compartment to allow remote actuation of the hood latch mechanisms 18 and 20.

Referring to FIG. 4, safety latch 26 includes a latch lever 90 pivoted at 92 to a bracket 94 secured to the hood inner panel 38. The latch lever 90 is spring biased so that a hook portion 96 at the end of latch lever 90 engages a flange 98 of the body panel 48 as the hood pops-up to limit opening movement of the hood 12 upon release of the hood latch mechanisms 18 and 20. Latch lever 90 has a handle 102 which is manually actuable to pivot latch lever 90 and thereby carry the hook portion 96 out of engagement with the flange 98 to permit full opening movement of the hood 12. Cables 34 and 36 are attached to each other, guided through a sleeve 104, and extend about the latch lever 90 as best seen in FIG. 4 to operate the hood retention devices 30 and 32 as will be hereinafter described.

Figure 2:
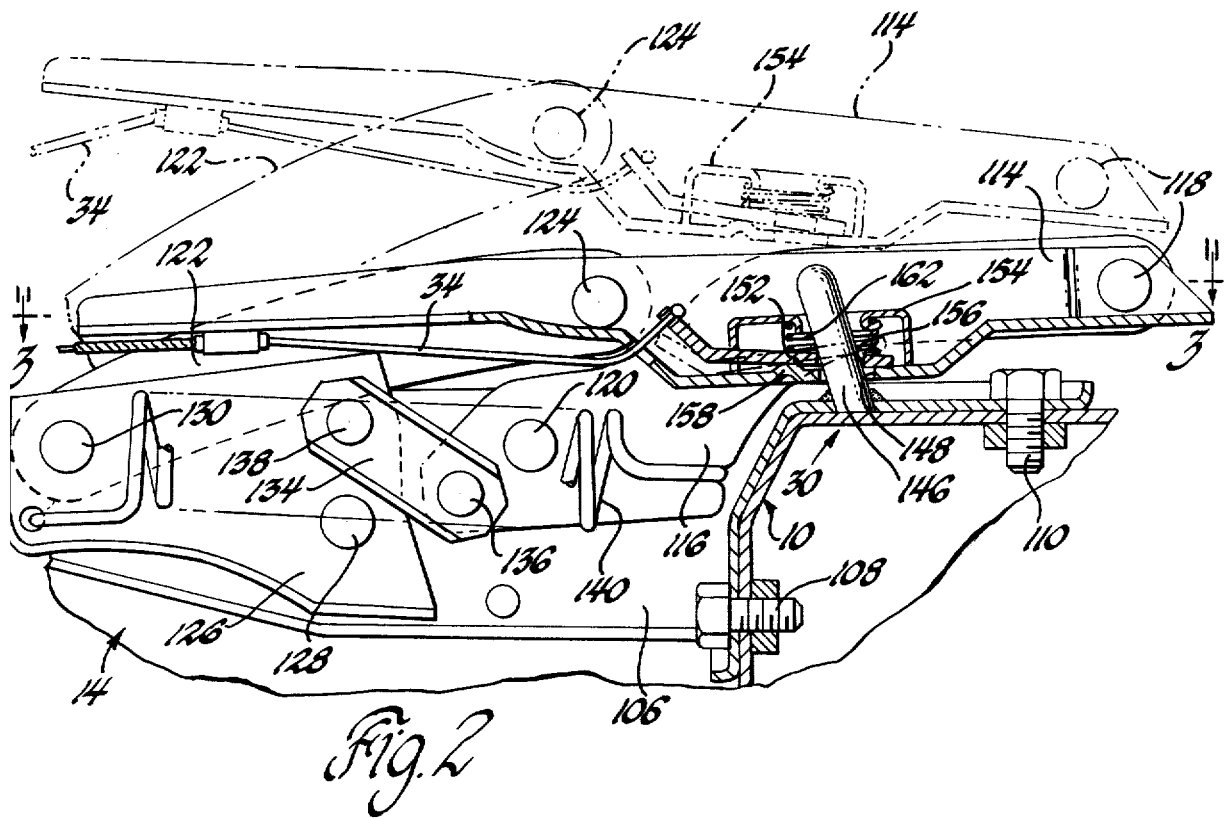
FIG. 2 is a partial side elevation view of a hood hinge and the hood retention device and taken in the direction of arrows 2—2 of FIG. 1 and having parts broken away and in section.

Referring to FIG. 2, hood hinge 14 includes a body support bracket 106 which is attached to the vehicle body 10 by bolts 108 and 110. A hood support bracket 114 is connected to the inner panel 38 of hood 12 by bolts, not shown. The body support bracket 106 and hood support bracket 114 are interconnected for movement relative one another by a conventional hood hinge linkage. An elongated link 116 is connected to the hood support bracket by a pivot 118 and to the body support bracket by a pivot 120. A link 122 is connected to the hood support bracket by pivot 124. A link 126 is connected to the body support bracket by pivot 128. Links 122 and 126 are connected by a pivot 130. A control link 134 is connected to link 116 by a pivot 136 and to link 126 by a pivot 138. Spring 140 connects links 116 and 126 and has an overcenter position with respect to pivot 120 of link 114 to hold link 116 in its normal hood closed position of FIG. 2. During opening movement of the hood 12 to the phantom line position of FIG. 2, link 122 pivots link 126 in a clockwise direction and the control link 134 in turn rotates link 116 in a counterclockwise direction to thereby lift the rear end of the hood 12 in the upward and forward direction. During such opening movement the spring 140 goes overcenter with respect to pivot 120 to assist in opening movement of the hood 12. It will be apparent that as the hood is closed, the various links reverse their direction of travel and the rear end of hood 12 is moved rearwardly and downwardly to the solid line closed position of FIG. 2.

Figure 3:
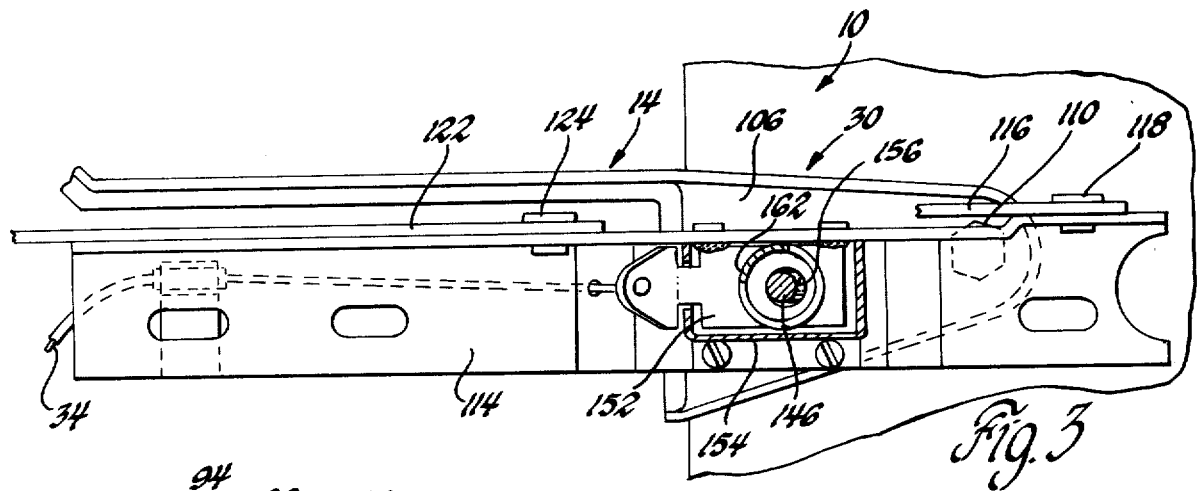
FIG. 3 is a plan view taken in the direction of FIGS. 3—3 of FIG. 2.

Referring to FIGS. 2 and 3, it will be seen that the hood retention device 30 includes a striker or pin 146 which is attached to the body support bracket 106 as by welding and is slanted somewhat in the forward direction. The pin 146 extends through an aperture 148 in the hood support bracket 114 so that when the hood is closed, the hood is restrained against lateral and rearward movement. A retaining plate 152 is mounted on hood support bracket 114 by a housing 154. Retaining plate 152 has an aperture 156 defined by walls which closely surrounds the pin 146. An abutment 158 of the hood support bracket 114 causes the retaining plate 152 to be inclined somewhat toward the pin 146 and provides a pivot about which the retaining plate 152 may be pivoted to its phantom line position of FIG. 2 in which it assumes a position more closely perpendicular to the pin 146. A spring 162 acts between housing 154 and retaining plate 152 to urge the retaining plate 152 to its normal inclined position of FIG. 2. The cable 34 is attached to the end of retaining plate 152 so that when the safety latch 26 is manually actuated the cable 34 pivots retaining plate 152 about the abutment 158. When the retaining plate 152 is in its normal solid line position of FIG. 2, the hood 12 cannot be opened beyond a limited extent because the walls of retaining plate 152 defining the aperture 156 engage the pin 146 to thereby prevent full opening movement of the hood hinge. The walls defining aperture 156 have sufficient clearance with respect to pin 146 to allow movement of the rear end or the hood to the limited extent necessary to allow the front of hood to pop-up when the hood latch mechanisms 18 and 20 are actuated.

Upon manual actuation of the safety latch 26, the cable 34 is tensioned and retaining plate 152 pivoted about abutment 158 to its phantom line position of FIG. 2 in which the aperture 156 is generally aligned with the aperture 148 of hood support bracket 114 so that opening movement of the hood hinge 14 is permitted in the aforedescribed manner to open the hood 12.

Thus it is seen that the invention provides an improved retention device for the rear corners of a vehicle hood which restrains the hood against lateral or rearward movement and will not permit opening movement of the hood hinge until release of the hood retention device.

What is claimed is:

1. In a vehicle body having a compartment, a closure panel for closing the compartment, hinge means connecting one end of the closure panel to the body, and releasable latch means acting between the other end of the closure panel and the body to releasably latch the other end of the closure panel to the body, closure panel retention means for latching the one end of the closure panel to the body when the closure panel is in closed position comprising: releasable retaining means acting between the closure panel and the body at the one end of the closure panel to retain the closure panel in closed position, and means interconnecting the latch means and the releasable retaining means to release the releasable retaining means upon release of the latch means to permit opening movement of the closure panel.

2. In a vehicle body having a compartment, a closure panel for closing the compartment, hinge means connecting one end of the closure panel to the body, a latch means for releasably latching the other end of the closure panel to the vehicle body, and a separately releasable safety latch for substantially limiting opening movement of the closure panel on release of the latch means, closure panel retention means for latching the one end of the closure panel to the body when the closure panel is in closed position comprising: releasable retaining means acting between the closure panel and the body at the one end of the closure panel to retain the closure panel against substantial opening movement and a cable interconnecting the safety latch and the releasable retaining means to release the retaining means upon release of the safety latch to permit full opening movement of the closure panel.

3. In a vehicle body having a compartment defined in part by a body panel, a closure panel for closing the compartment, hinge means at one end of the closure panel for hinging the closure panel to the body panel, and latch means for releasably latching the other end of the closure panel to the vehicle body, closure panel retention means for latching the one end of the closure panel comprising: striker means on one of the panels extending toward the other panel, retaining means mounted on the other panel and engageable wih the striker means for normally latching the closure panel to the body panel in the closed position of the closure panel to prevent substantial opening movement of the closure panel, and means interconnecting the latch means and the retaining means upon release of the latch means to release the retaining means from the striker means to permit opening movement of the closure panel.

4. In a vehicle body having a compartment defined in part by a body panel, a closure panel for closing the compartment, and hinge means connecting one end of the closure panel to the vehicle body, a latch mechanism for releasably latching the other end of the closure panel to the vehicle body, and a separately releasable safety latch for substantially limiting opening movement of the closure panel upon release of the latch mechanism, a closure panel retention means for retaining the one end of the closure panel in closed position comprising: a pin means on one of the panels at the one end of the closure panel and being inclined forwardly and extending toward the other panel, means on the other panel having an aperture in which the pin means is received when the closure panel is in closed position to limit the closure panel against substantial lateral or rearward movement, movable retaining means on the other panel having a normal position preventing full opening movement of the closure panel by being engaged with the pin means upon limited opening movement of the closure panel in response to release of the latch mechanism, and means interconnecting the safety latch and the movable retaining means for moving the retaining means to a second position permitting full opening movement of the closure panel by preventing engagement with the pin means when the safety latch is released.

5. In a vehicle body having a compartment, a closure panel for closing a compartment, hinge means connecting one end of the closure panel to the body, and a latch for releasably latching the other end of the closure panel to the vehicle body, a retention device for retaining the one end of the closure panel comprising: a pin on the body extending upwardly and being inclined forwardly, the closure panel having an aperture in which the pin is received when the closure panel is in closed position to prevent substantial lateral or rearward movement of the closure panel, an apertured retaining plate pivotally mounted on the closure panel and closely surrounding the pin when the closure panel is in closed position, means biasing the apertured retaining plate to a normal position in which the retaining plate prevents substantial opening movement of the closure panel by engaging the pin, and means interconnecting the latch and the retaining plate for pivoting the retaining plate against the biasing means to a second position permitting opening movement of the closure panel by aligning the aperture of the apertured retaining plate with the pin to prevent engagement of the pin by the apertured retaining plate.

* * * * *